United States Patent [19]

Kane

[11] Patent Number: 5,226,691

[45] Date of Patent: Jul. 13, 1993

[54] VEHICULAR AXLE ASSEMBLY WITH REMOVABLE AND REPLACEABLE SPINDLES

[76] Inventor: James T. Kane, 1601 Dona Bay Dr., Nokomis, Fla. 34275

[21] Appl. No.: 914,081

[22] Filed: Jul. 16, 1992

[51] Int. Cl.⁵ .......................................... B60B 35/00
[52] U.S. Cl. ................................. 301/132; 301/130
[58] Field of Search ............... 301/111, 114, 126, 128, 301/130, 131, 132, 124.1, 137

[56] References Cited

U.S. PATENT DOCUMENTS

| | | | |
|---|---|---|---|
| 784,383 | 3/1905 | Butler | 301/132 X |
| 825,108 | 7/1906 | Butler | 301/132 X |
| 1,001,905 | 8/1911 | Tuller | 301/132 |
| 1,053,810 | 2/1913 | Hedges | 301/132 |
| 1,170,172 | 2/1916 | Litchfield | 301/132 |
| 1,575,064 | 3/1926 | Kennedy | 301/132 X |
| 2,155,156 | 4/1939 | Townsend | 301/132 |

FOREIGN PATENT DOCUMENTS 10252 of 1904 United Kingdom ................ 301/130

*Primary Examiner*—Russell D. Stormer
*Attorney, Agent, or Firm*—David H. Semmes

[57] ABSTRACT

A three piece axle and wheel spindle assembly for vehicular trailers wherein a damaged spindle may be replaced at will, characterized by corresponding axle and spindle flange plates, the former defining a positive spindle flange plate positioners, the latter a removable plate, inter-locking therewith. Lefthand and righthand spindle flange plates each form a cam slide, corresponding to a cam positioner against the axle flange plate and a receptor flange seat for the axle plate. Removal and replacement of one or the other wheel spindle may be effected en route and without any axle dismantling from the trailer. Fastening bolts of the three piece assembly are readily accessible, due to their disposition at right angles to the axis of the axle.

1 Claim, 2 Drawing Sheets

VEHICULAR AXLE ASSEMBLY WITH REMOVABLE AND REPLACEABLE SPINDLES

BACKGROUND OF INVENTION

Conventional trailer axles are known to comprise a unitary, one piece construction such that repairing a damaged spindle thereon requires removing the entire axle from the trailer. Removal of the entire axle is time consuming and inordinately costly. Moreover, repair may not be undertaken en route, and the trailer must be towed to a repair facility. The present three piece trailer axle with removable stub spindles is adapted to use on trailers such as are towed into and out of harsh environments, or moved under abnormal road and trail conditions such that axle spindles with associated wheel bearings may suffer damage. By way of example, boat trailer axles and spindles submerged in salt or fresh water are often misaligned and worn by corrosion, dirt, etc. Likewise, utilities trailers exposed to sand and dust are subjected to the same environment. The invention thus is characterized by an axle assembly having readily removable and replaceable spindles wherein the assembly is constructed in three parts, namely the center axle section, with axle flange plates; a lefthand spindle flange and a righthand spindle flange plate, these spindle flange plates being bolted, transversely to the axle flange plates.

THE PRIOR ART

The prior art is best represented by Burgett, Paul D., U.S. Pat. No. 4,890,889, issued Jan. 2, 1990. This patent defines a replaceable spindle assembly which includes a pair of plates connecting the spindle to the axle by means of axially aligned mounting bolts. Shear forces are distributed by means of angular ribs which fit into grooves in opposed plates. Additionally, four cap screws and lock washers are required to further secure the plates from moving. In the present construction, on the other hand, the load weight is carried on bottom flanges which are tapered and matched, interlocking the two plates together. Thus, two vertical guideposts of an axle flange plate lock the opposed spindle plate in the center of its receiver configuration, thereby restricting any movement of the spindle plate. British Patent 10252 dated May 4, 1904 discloses relates structure which is difficult to assemble and lacks fastening means for opposed plates such that they may be bolted at a right angle to the axle.

In contrast to the prior art, and within this invention, the trailer chassis and payload weight rests on corresponding tapered axle flange plates and spindle flange receptors at the bottom of each axle plate and spindle plate. A top slide of the axle flange plate locks its bottom taper in place. Moreover, all trailer and payload weight rests on corresponding lower flange segments and since the spindle assembly is locked by bolts onto the axle, no payload weight is sustained on the bolts, per se. In addition, a brake flange may be welded to the spindle itself. The disposition of the four bolts herein is such that a complete hub and brake assembly may be mounted on the unit for ready installation. Alignment is assured by anchoring into the four elongated bolt holes on the axle plate and threaded bolt holes on the spindle flange plate. Finally, tapering of the axle plate and the spindle flange plate, plus the weight of the load, insures a tight overall flange construction.

In the patents to G. S. Owen U.S. Pat. No. 1,480,462 and R. W. Pointer U.S. Pat. No. 2,501,579, shear forces are born by axially aligned bolts; whereas in the present invention, the flange clamping bolts are misaligned with respect to the spindle axis and shear forces are applied to interlocking flange plates, per se, not bolts.

SUMMARY OF INVENTION

The invention is a three piece trailer axle with removable spindles, the unit being constructed in three parts, namely: the center axle section, or main support, which is conventionally secured to the trailer chassis by springs, etc., and two idler wheel stub spindle assemblies. All of the basic elements of the invention in this complete axle assembly are joined by flanges which are bolted together. The flanged spindle plates match up to opposed flange plates of the axle, per se.

The objective of invention is to achieve, under spindle failure, a rapid replacement of the spindle without removing the axle from the trailer. The availability of a spare spindle assembly thus permits the vehicle and trailer operator to quickly and inexpensively perform the repair on site, as readily as changing a tire.

Further advantages of invention evolve from the unique three piece construction, wherein the center section thereof has a fixed flange plate on each end, adjacent spindle plates with opposed matching left and righthand flanges, thereby permitting reversal on either side. Moreover, since a spare stub spindle plate herein may be carried with a spare tire and installed as easily as changing a tire, the driver is enabled to repair the trailer on site without having to move the damaged trailer to the side of the trail or road, not to mention the inconvenience of getting access to a garage repair facility or worse getting a trailer. Accordingly, operating down time is significantly reduced.

DESCRIPTION OF THE PREFERRED EMBODIMENTS

As iterated above, the assembled axle assembly comprises three sub assemblies, namely, the center axle section with left and righthand axle flange plates; a lefthand spindle flange plate; a righthand spindle flange plate.

Figure 1:
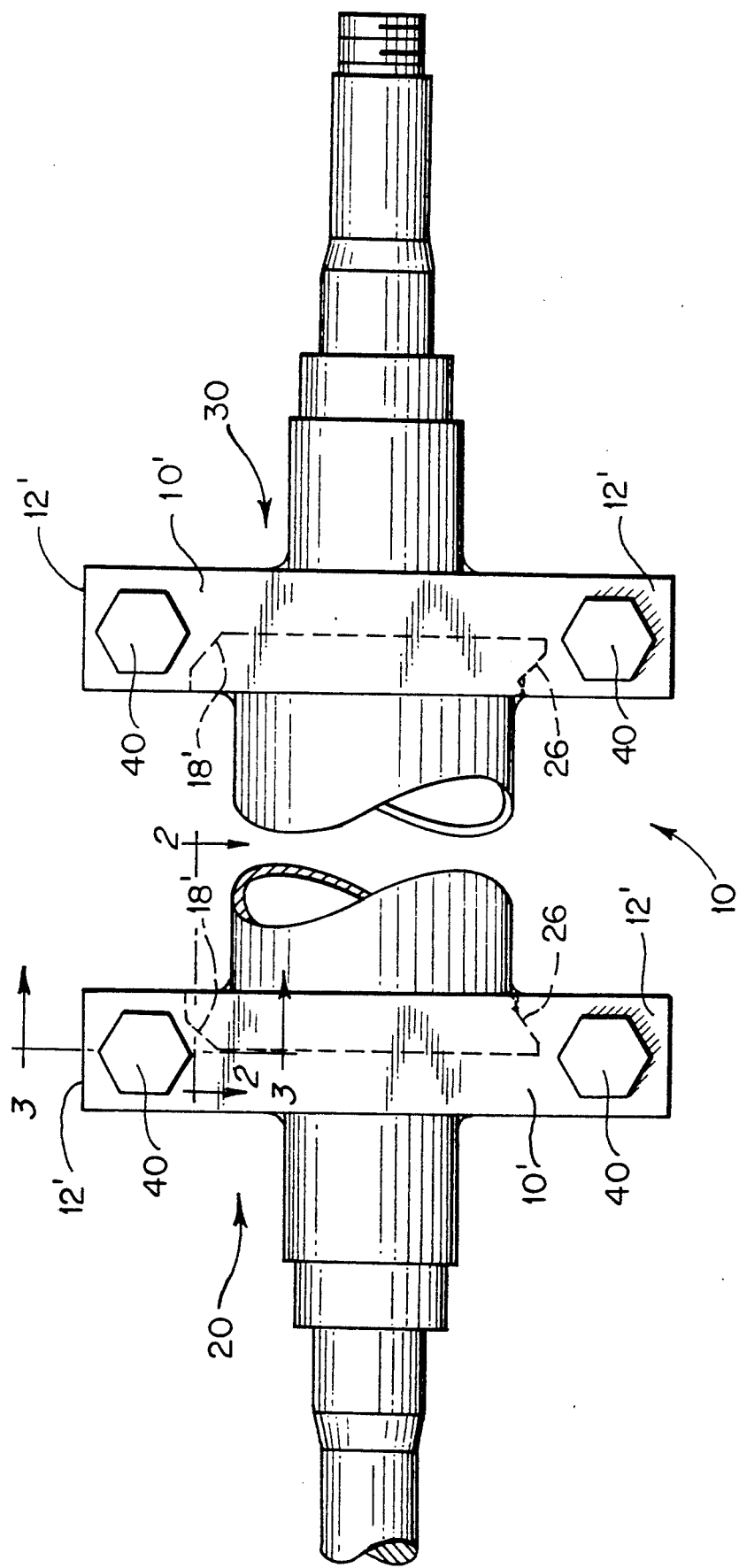
FIG. 1 is a view in side elevation of invention wherein the three part trailer axle assembly presented includes lefthand and righthand spindle flange plate assemblies. A portion of the axle is broken away.

Referring to FIG. 1, a conventional trailer axle is represented in the drawings as element 10. Lefthand and righthand axle flange plates 10' are each welded to the axle. These axle flange plates 10' form a transverse curvilinear shelf 18', a lower portion of which is beveled transversely to form with a curvilinear shelf upper cam surface and positioner 19'. These surfaces extend transversely between upright guideposts 12' wherein axle flange plate abutments 14' extend. Guideposts 12' also extend below each plate abutment 14'. At the lowermost portion of the plate abutment 14' is the tapered abutment projection 16', the same forming a transversely extending spindle plate locking flange between posts 12'. The trailer load may be applied to projection 16' and through a corresponding lower spindle flange seat 26, to be defined hereinafter. Both axle flange plates 10' and spindle flange plates 20-30 are coterminous, vertically and horizontally.

Figure 2:
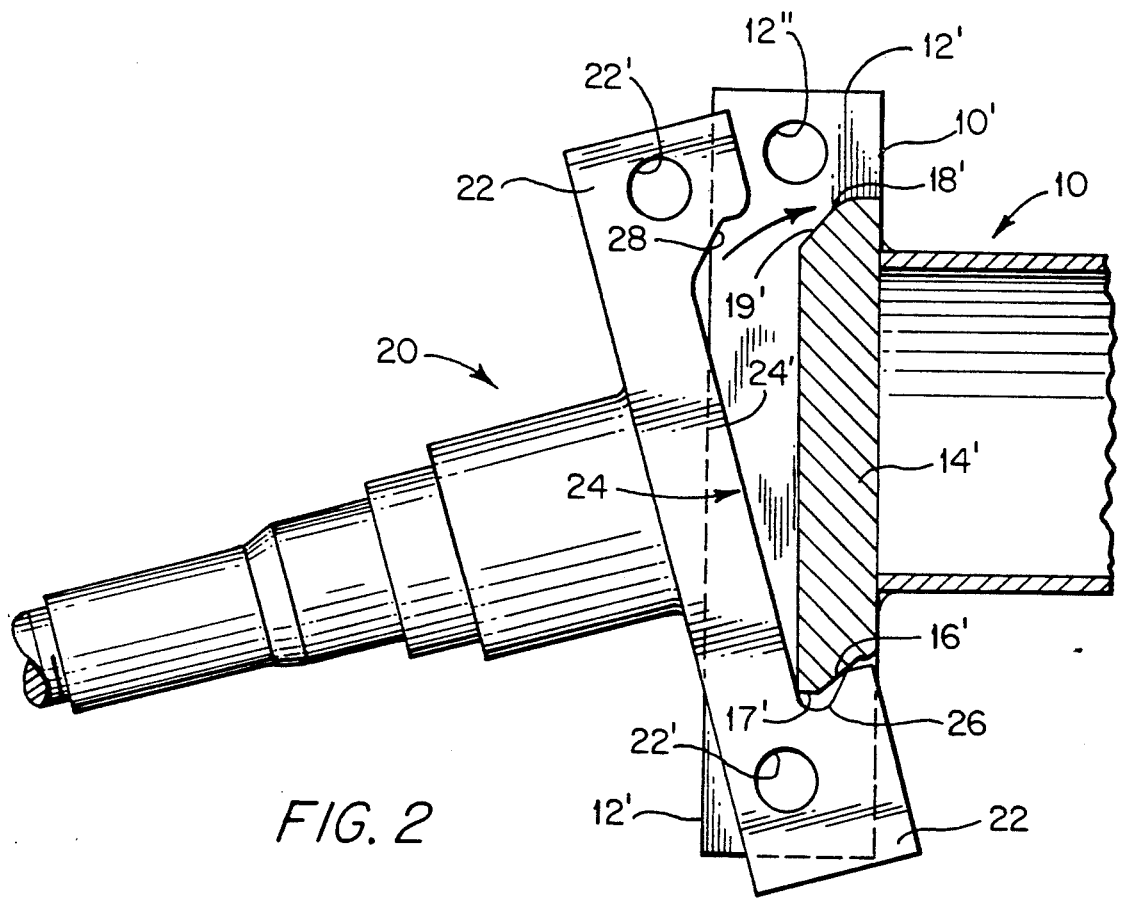
FIG. 2 is a vertical section view, enlarged, of a lefthand portion of the overall FIG. 1 assembly, taken along the line 2—2 of FIG. 1. This drawing represents a preliminary step of assembly, before securing the spindle flange plate to the axle flange plate.

The lefthand spindle flange plate 20 and its plate extensions 22 fit between the upright guideposts 12' of axle flange plate 10', whereby corresponding apertures defined in ends of each secure fastening bolts 40, reference FIG. 2. Threaded bolts 40 seat in the spindle flange plate extensions 22, after passing through apertures of corresponding axle flange extensions 12'. This interlocking relationship between opposed plates 10' and 20 is apparent from the conformation of cutout 24 of spindle flange plate 20, the cutout having an interfitting relationship with element 14'-16'-18' of the axle flange plate 10'. As will be apparent, the upper cam slide contact surface 28, of the spindle flange plate 20 is adapted to seat itself upon opposed shelf 18' and its positioner 19', thus forcing lefthand spindle flange plate 20 into registry with its corresponding flange plate 10'. At the same time, the corresponding lowermost abutment projection 16'-17' of the axle flange will seat itself in lowermost receptor channel 26 of the spindle flange plate 20, as will be evident from reference to FIG. 2.

The facility with which each set of opposed flange plates 10' and 20 may be assembled will be apparent from reference to the corresponding opposed contacting axle flange plate surfaces 14'-16'-17'-18'-19' and the interfitting slide and receptor walls 24'-26-28 of the spindle flange plate cutout 24.

Figure 3:
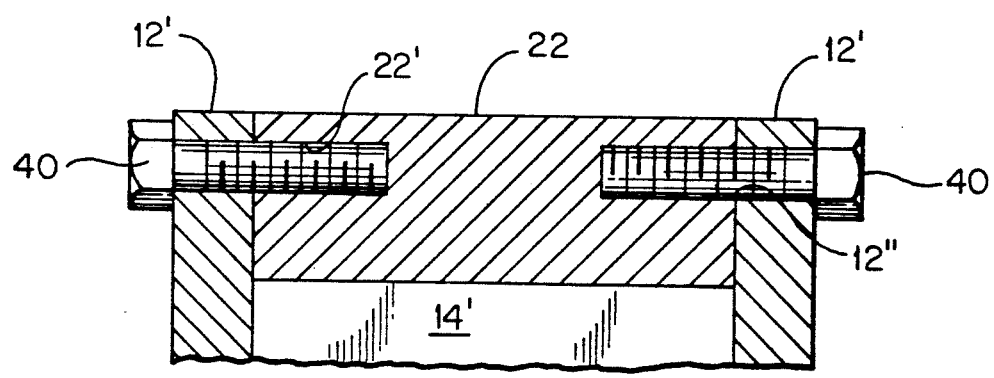
FIG. 3 is a partial view in vertical section of the spindle flange and axle flange plates of FIG. 1, fully assembled.

Whereas details of righthand spindle assembly 30, FIG. 1 are not specifically depicted, said assembly comprises a reverse mirror image of the spindle flange plate 20 whereby elements 32-34-36-38 correspond exactly to elements 22-24-26-28 of spindle flange plate 20. Thus is provided an interlocking relationship with the righthand axle flange plate 10', itself a reverse image of the lefthand assembly, depicted in FIGS. 2 and 3.

In mounting either a lefthand spindle flange plate 20 or a righthand spindle flange plate 30, a slight acute, negative angular inclination should initially be imposed upon either of the spindle flange plates, whereby lower tapered receptor channels 26-36 may slip into forced locking position relative to the counterpart projections 16'-17' of the axle flange plate 10. See FIG. 2. Thereafter, opposed axle and spindle flange plates are forcefully set into a contiguous operative relationship. For example, a simple push of the spindle plate 20 from left to right will thus cause registry of opposed axle flange plate 14' into the cutout 24. The spindle flange plate 20 is accordingly rocked towards axle 10. By such a pushing-rocking movement, abutment projection 16' of the axle flange plate 10' will first register in the spindle flange plate receptor channel 26 and sequentially it will be forced into locking contact by the cam action between elements 18'-19' and 28 of the respective plates. To reiterate, forcible contact of cam slide 28 of the spindle flange plate 20 against cam surface positioner 18' of the axle flange plate 10' causes an upward transition of the lefthand spindle plate into full registry, whereby all opposed corresponding flange elements are automatically aligned. Likewise aligned and set are the opposed bolt apertures 12" and 22' of the respective corresponding top and bottom extension 12'-22 of opposed plates 10'-20. See FIG. 3. Conversely as to the prior art, securing of the opposed plates is effected by fastening of threaded bolts 40, at right angles to a centerline drawn axially through the respective axle and connected spindle flange plates. The spindle flange plate 20 is likewise threaded in extension 22 to form plural bolt seats. Thus, two vertical axle plate posts 12'-12' lock the spindle plate 20 in the center of the axle flange plates 10'-10', thereby restricting any forward and rearward movement of either spindle flange plate, during subsequent operation of the trailer vehicle. See FIGS. 1 and 3.

From the aforementioned it will be apparent that the converse mounting of righthand spindle flange plate 30 to axle of righthand axle plate 10' will apply. Plate 30 is pushed at a slight negative angular inclination towards opposed abutment 14' of axle plate 10', etc. See FIG. 2, reference the counterpart assembly, above defined.

Whereas the invention has been defined with specific reference to the drawings, various modifications thereto are encompassed by the annexed claims.

I claim:

1. A three piece vehicular trailer axle assembly for facile removal and attachment of wheel spindles thereto, comprising:
    a) a central axle, said axle mounting on ends thereof lefthand and righthand axle flange plates, each said axle flange plate defining an upright abutment to engage an opposed spindle plate; a positive axle spindle flange plate cam surface and positioner, extending transversely of an upper portion of the axle flange plate and vertically spaced therefrom a transversely extending abutment, engageable by a spindle plate in locking relation thereto;
    b) a pair of removable spindle flange plates interlocking with respective axle bearing flange plates, said spindle flange plates each forming a cam slide corresponding to the cam surface and positioner of the axle flange plate and a receptor channel for receiving the abutment projection of the axle flange plate;
    c) bolt means and interlocking opposed axle flange and spindle flange plates into contiguous registry with each other, said bolt means being disposed at right angles to a centerline of the central axle.

* * * * *